United States Patent
Jang et al.

(10) Patent No.: US 12,418,068 B2
(45) Date of Patent: Sep. 16, 2025

(54) BATTERY MODULE AND BATTERY PACK INCLUDING THE SAME

(71) Applicant: LG ENERGY SOLUTION, LTD., Seoul (KR)

(72) Inventors: Sunghwan Jang, Daejeon (KR); Junyeob Seong, Daejeon (KR); Myungki Park, Daejeon (KR); Jehwan Sin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 639 days.

(21) Appl. No.: 17/783,389

(22) PCT Filed: Oct. 7, 2021

(86) PCT No.: PCT/KR2021/013753
§ 371 (c)(1),
(2) Date: Jun. 8, 2022

(87) PCT Pub. No.: WO2022/085997
PCT Pub. Date: Apr. 28, 2022

(65) Prior Publication Data
US 2023/0012792 A1    Jan. 19, 2023

(30) Foreign Application Priority Data

Oct. 19, 2020 (KR) .................. 10-2020-0135020
Dec. 24, 2020 (KR) .................. 10-2020-0183858

(51) Int. Cl.
*H01M 50/289* (2021.01)
*H01M 50/204* (2021.01)
(Continued)

(52) U.S. Cl.
CPC ......... *H01M 50/24* (2021.01); *H01M 50/204* (2021.01); *H01M 50/247* (2021.01);
(Continued)

(58) Field of Classification Search
None
See application file for complete search history.

(56) References Cited

U.S. PATENT DOCUMENTS

| | | |
|---|---|---|
| 2017/0190264 A1 | 7/2017 | Kim et al. |
| 2018/0138565 A1 | 5/2018 | Lee et al. |

(Continued)

FOREIGN PATENT DOCUMENTS

| | | |
|---|---|---|
| CN | 108140793 A | 6/2018 |
| CN | 109216610 A | 1/2019 |

(Continued)

OTHER PUBLICATIONS

International Search Report (PCT/ISA/210) issued in PCT/KR2021/013753 mailed on Feb. 8, 2022.
(Continued)

*Primary Examiner* — Tracy M Dove
(74) *Attorney, Agent, or Firm* — Birch, Stewart, Kolasch & Birch, LLP

(57) ABSTRACT

A battery module includes a battery cell stack in which a plurality of battery cells are stacked, a bus bar frame coupled to each of the front and rear ends of the battery cell stack, a frame member that houses a cell block including the battery cell stack and the bus bar frame, a pad part located at one end of the bottom part of the frame member, and a film part connected to the pad part and protruding toward the bus bar frame.

18 Claims, 10 Drawing Sheets

(51) Int. Cl.
   *H01M 50/24*      (2021.01)
   *H01M 50/247*     (2021.01)
   *H01M 50/505*     (2021.01)

(52) U.S. Cl.
   CPC ....... *H01M 50/289* (2021.01); *H01M 50/505* (2021.01); *H01M 2220/20* (2013.01)

(56) References Cited

U.S. PATENT DOCUMENTS

| | | |
|---|---|---|
| 2019/0074557 A1 | 3/2019 | Shin et al. |
| 2019/0280285 A1 | 9/2019 | Jansen et al. |
| 2020/0194851 A1 | 6/2020 | Sec et al. |
| 2020/0395643 A1 | 12/2020 | Seo et al. |
| 2021/0228291 A1 | 7/2021 | Kim et al. |
| 2022/0052391 A1 | 2/2022 | Kim et al. |
| 2022/0102813 A1 | 3/2022 | Cho et al. |
| 2022/0384875 A1* | 12/2022 | Park .................... H01M 10/647 |
| 2022/0416327 A1* | 12/2022 | Jang .................... H01M 50/507 |

FOREIGN PATENT DOCUMENTS

| | | |
|---|---|---|
| CN | 209312824 U | 8/2019 |
| CN | 210349920 U | 4/2020 |
| EP | 3 113 278 B1 | 1/2018 |
| EP | 3 913 702 A1 | 11/2021 |
| KR | 10-2019-0139620 A | 12/2013 |
| KR | 10-1916720 B1 | 11/2018 |
| KR | 10-2019-0110782 A | 10/2019 |
| KR | 10-2050530 B1 | 12/2019 |
| KR | 10-2020-0030967 A | 3/2020 |
| KR | 10-2020-0068478 A | 6/2020 |
| KR | 10-2020-0109127 A | 9/2020 |
| KR | 10-2020-0142240 A | 12/2020 |
| KR | 10-2020-0142242 A | 12/2020 |
| WO | 2018/022907 A1 | 2/2018 |

OTHER PUBLICATIONS

Extended European Search Report for European Application No. 218833069.3, dated Jul. 31, 2023.

* cited by examiner

[FIG. 2]
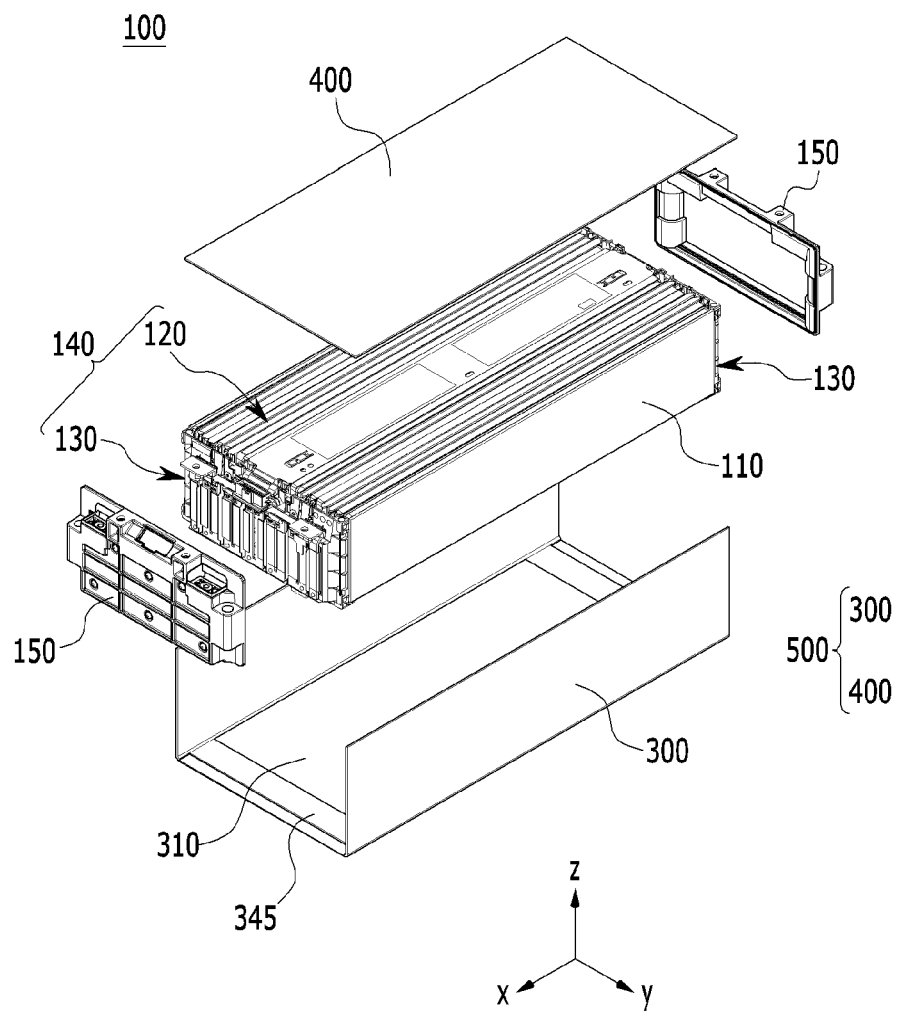<br>

[FIG. 3]
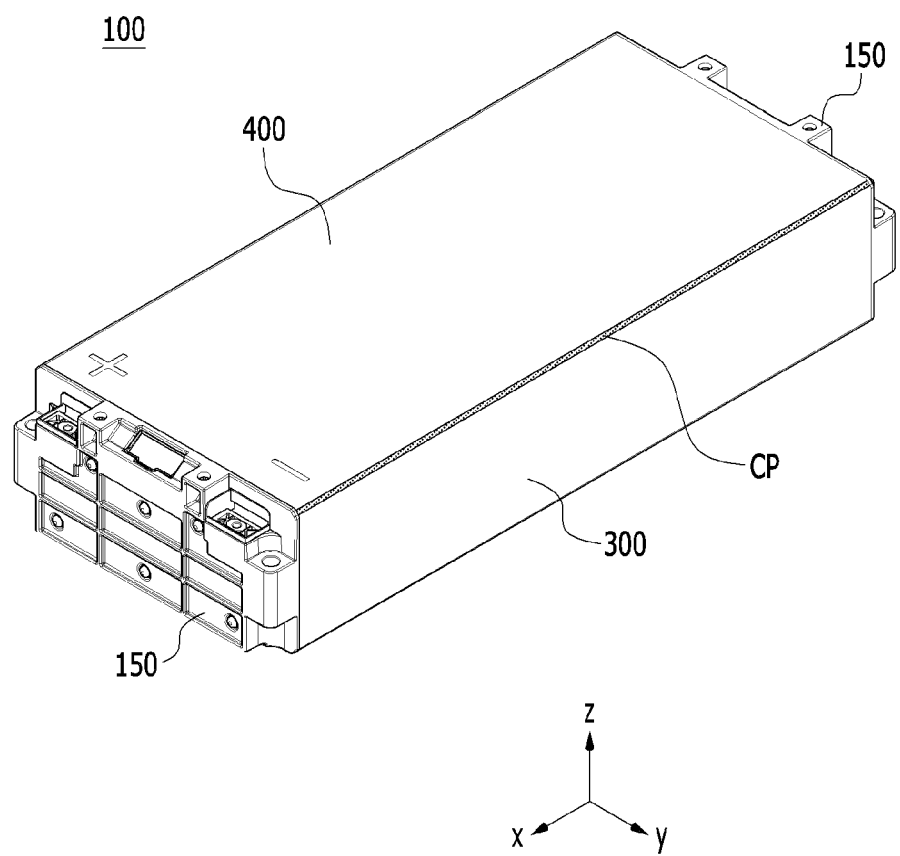

[FIG. 4]
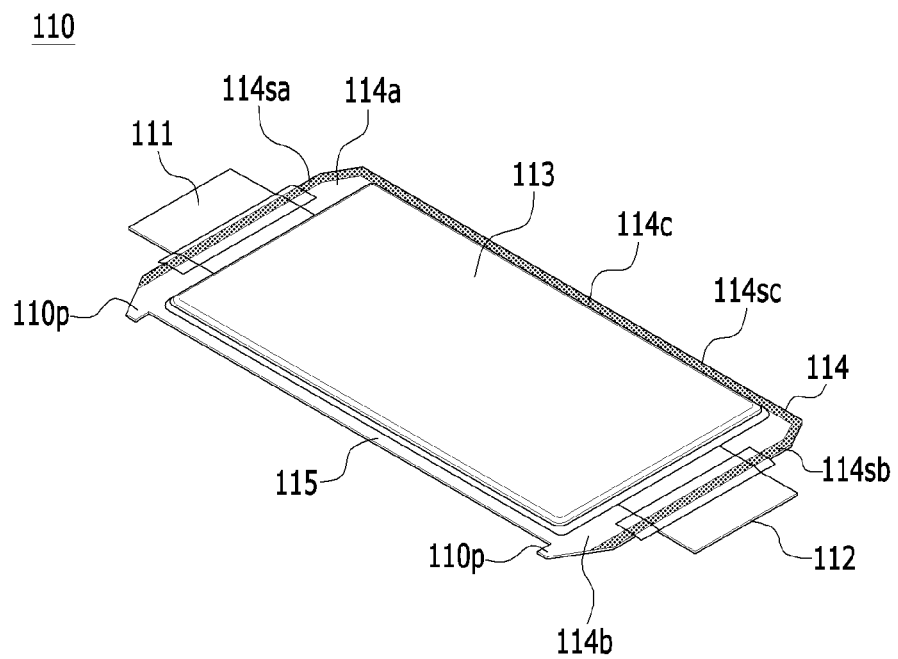

[FIG. 5]
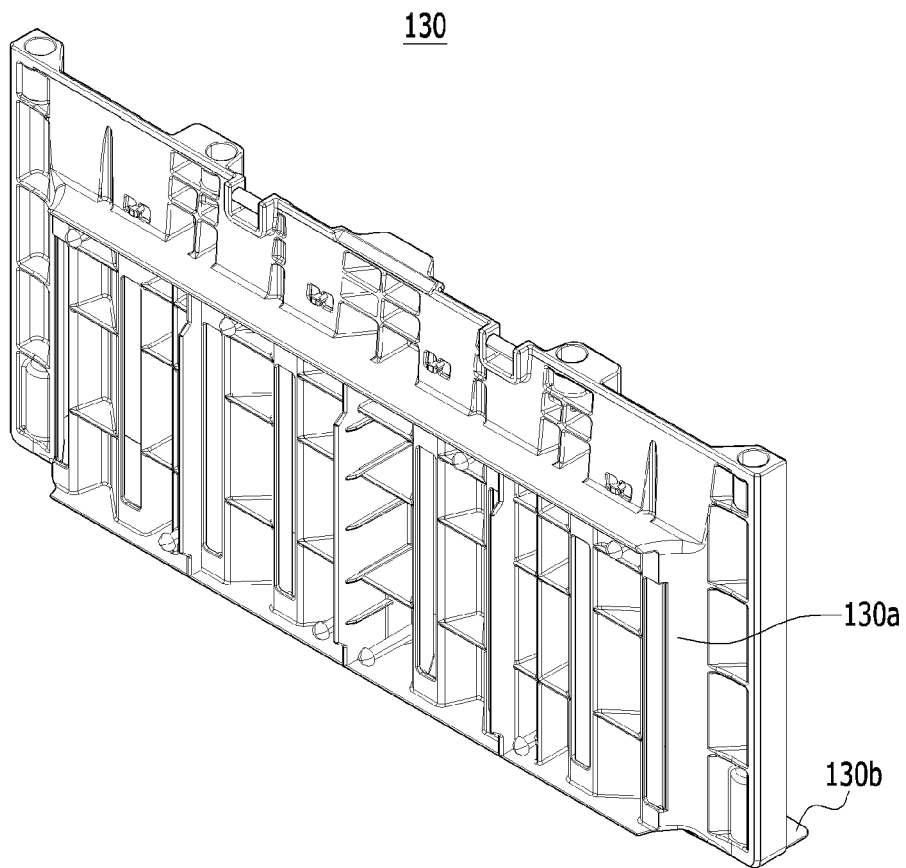

[FIG. 6]
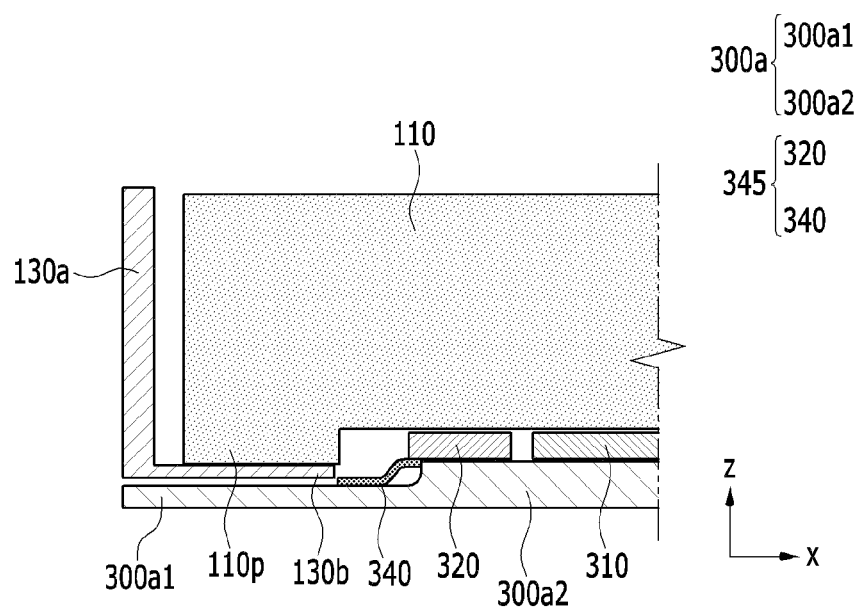

[FIG. 7]
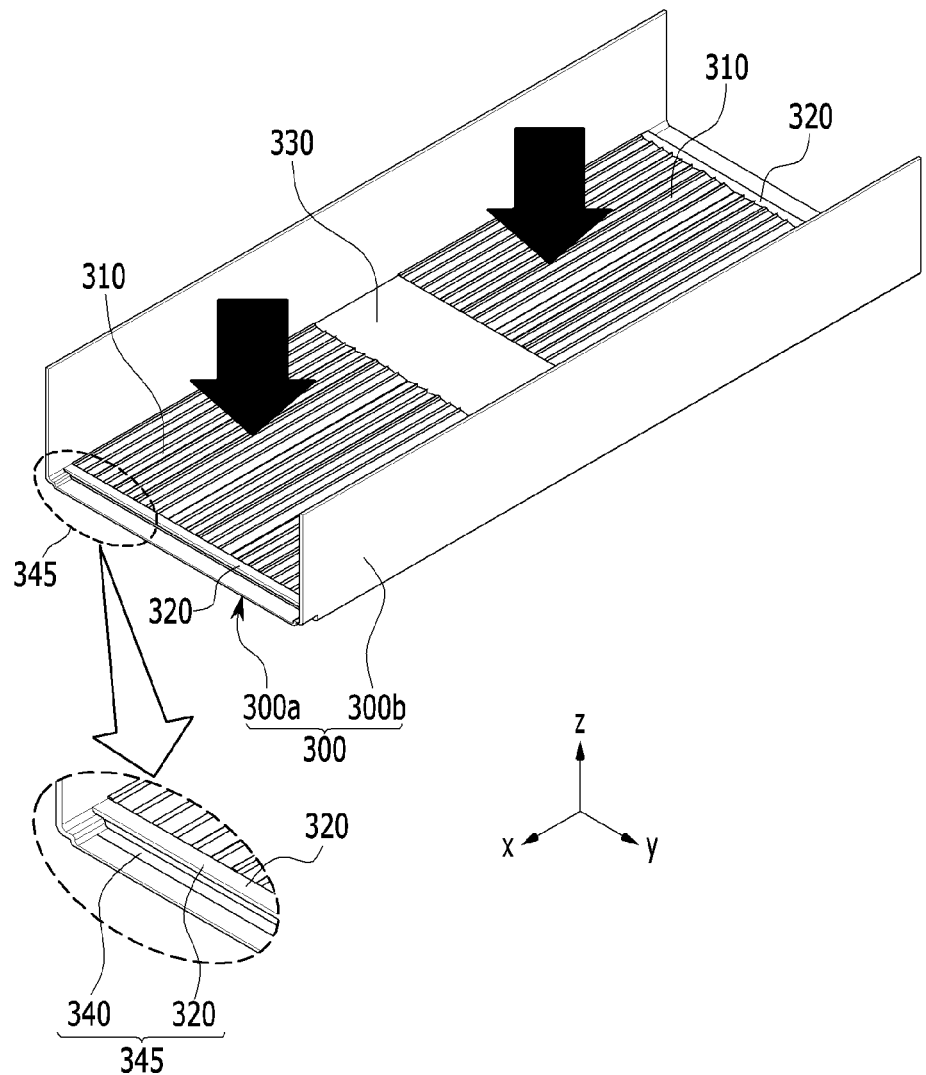

[FIG. 8]
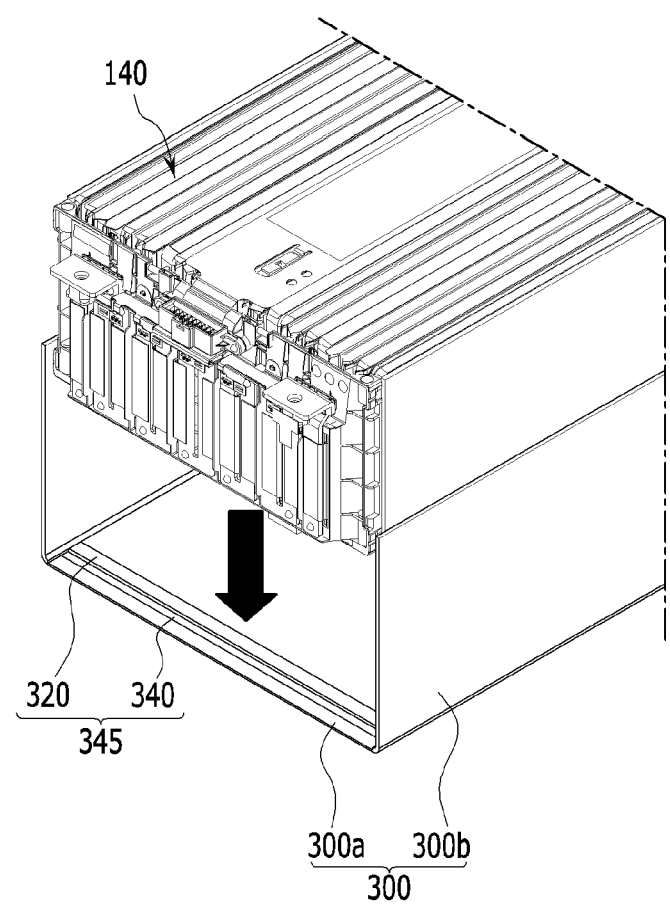

[FIG. 9]
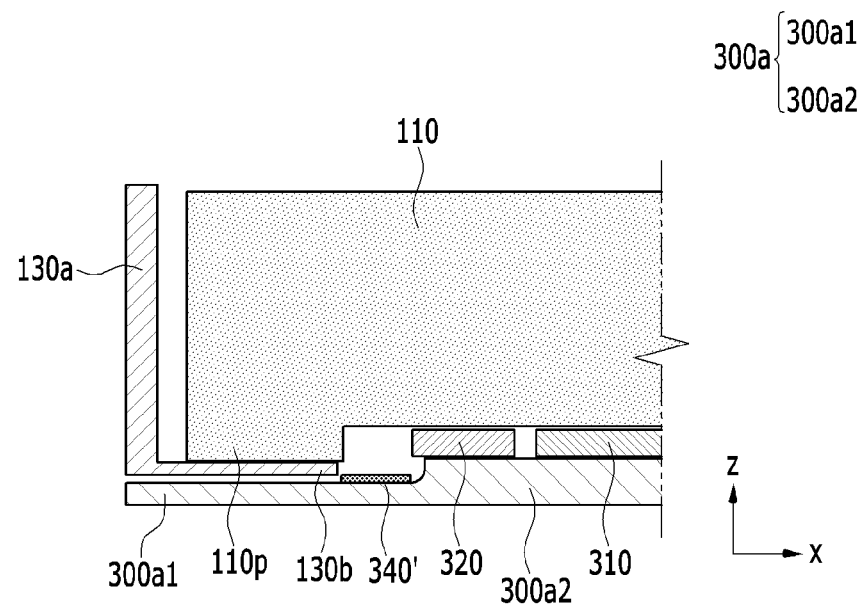
[FIG. 10]
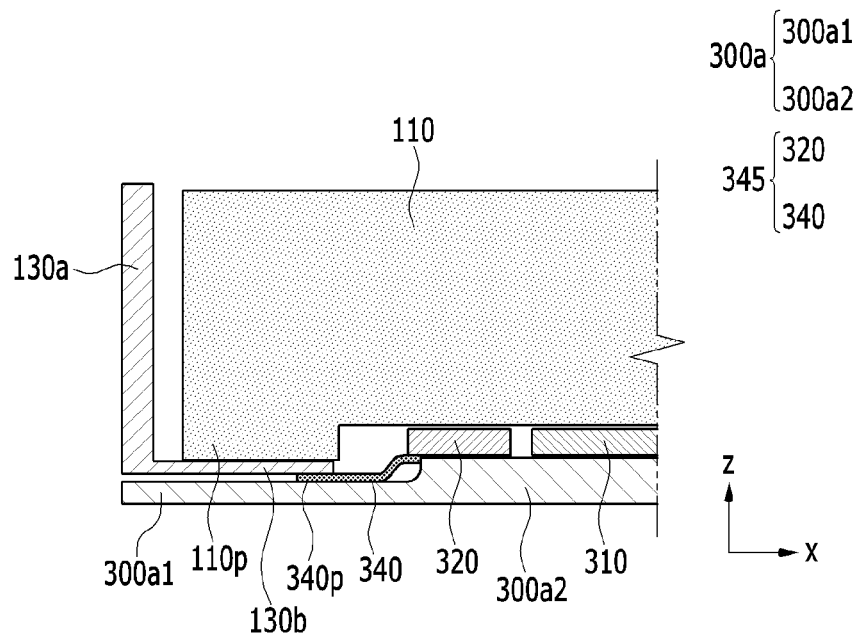

[FIG. 11]
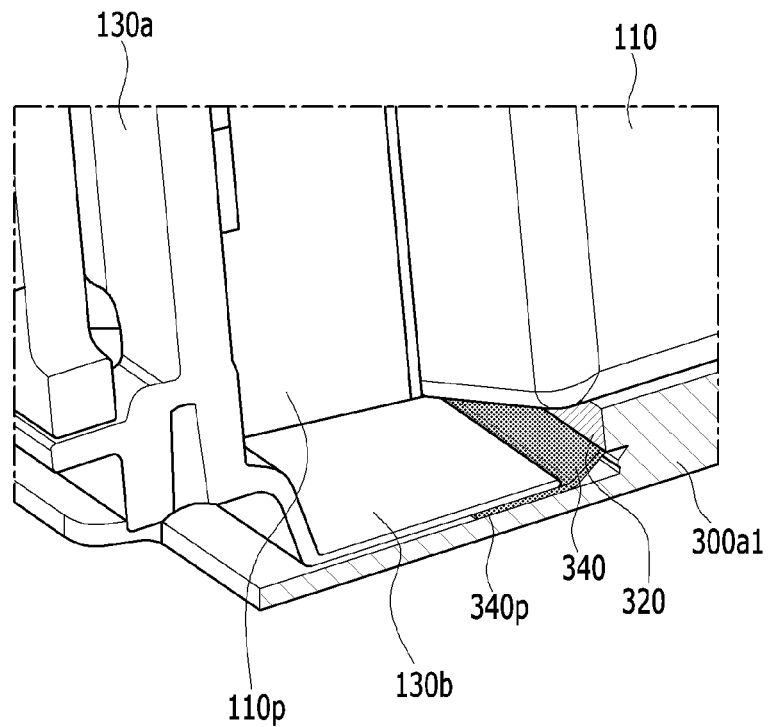
[FIG. 12]
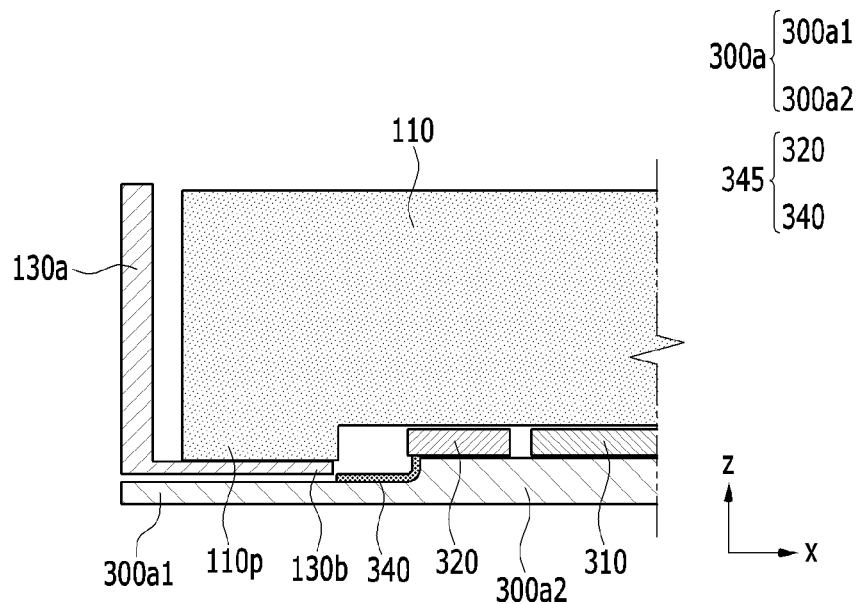

BATTERY MODULE AND BATTERY PACK INCLUDING THE SAME

TECHNICAL FIELD

Cross Citation with Related Application(s)

This application claims the benefit of Korean Patent Application No. 10-2020-0135020 filed on Oct. 19, 2020 and Korean Patent Application No. 10-2020-0183858 filed on Dec. 24, 2020 with the Korean Intellectual Property Office, the disclosures of which are incorporated herein by reference in their entirety.

The present disclosure relates to a battery module and a battery pack including the same, and more particularly to a battery module which improves the assembly property and insulation property, and a battery pack including the same.

BACKGROUND

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle or large-sized battery module having a plurality of battery cells electrically connected to one another is used.

The middle- or large-sized battery module is preferably manufactured so as to have as small a size and weight as possible. Therefore, a prismatic battery, a pouch type battery or the like, which can be stacked with high integration and has a small weight relative to capacity, is usually used as a battery cell of the middle- or large-sized battery module. Meanwhile, in order to protect the battery cell stack from external impact, heat or vibration, the battery module may include a module frame that is opened in its front and rear surfaces and houses the battery cell stack in an internal space.

FIG. 1 is an exploded perspective view illustrating a battery module having a mono frame according to the related art.

Referring to FIG. 1, a battery module may include a battery cell stack 12 formed by stacking a plurality of battery cells 11, a mono frame 20 of which a front surface and a rear surface are opened so as to cover the battery cell stack 12, and end plates 60 that cover the front and rear surfaces of the mono frame 20. In order to form such a battery module, it is necessary to horizontally assemble the battery module such that the battery cell stack 12 is inserted into the opened front or rear surface of the mono frame 20 along the X-axis direction as shown by the arrow in FIG. 1. However, in order to stably perform such a horizontal assembly, a sufficient clearance has to be secured between the battery cell stack 12 and the mono frame 20. Here, the clearance refers to a gap generated by press-fitting and the like.

A thermal conductive resin layer (not shown) may be formed between the battery cell stack 12 and the mono frame 20. The thermal conductive resin layer can play a role of transferring the heat generated from the battery cell stack to the outside of the battery module, and fixing the battery cell stack inside the battery module. When the clearance becomes larger, the use amount of the thermal conductive resin layer may become larger than necessary.

In addition, the height of the mono frame 20 should be designed large in consideration of the maximum height of the battery cell stack 12 and an assembly tolerance during the insertion process, and the like, which may lead to generation of unnecessary wasted space.

Further, there is a need to reinforce an insulation problem that may occur between the battery cell stack 12 and a frame member for housing the battery cell stack 12 as in the mono frame 20.

DETAILED DESCRIPTION OF THE INVENTION

Technical Problem

It is an object of the present disclosure to provide a battery module which improves the assembly property and insulation property, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a bus bar frame coupled to at least one of the front and rear ends of the battery cell stack, a frame member that houses a cell block, the cell block including the battery cell stack and the bus bar frame, a pad part located at one end of the bottom part of the frame member, and a film part connected to the pad part and protruding toward the bus bar frame.

A bottom part of the frame member comprises a first portion and a second portion, the first portion located at the edge with respect to a longitudinal direction of the battery cell, the second portion located inside the first portion, and a thickness of the first portion may be less than a thickness of the second portion.

The battery further comprises a thermal conductive resin layer located between the second portion and the battery cell stack, wherein the pad part may be located between the thermal conductive resin layer and the first portion.

The pad part may be located on the second portion, and the film part is located on the first portion.

The film part may be formed so as to be in contact with a step portion connecting the first portion and the second portion of the bottom part of the frame member.

The frame member is opened on both sides facing each other with respect to the longitudinal direction of the battery cell, the bus bar frame is connected to the battery cell stack on the opened both sides of the frame member, the bus bar frame comprises a main frame arranged perpendicular to the longitudinal direction of the battery cell and a bending part extending from a lower part of the main frame, and the bending part may be located on the first portion of the bottom part of the frame member.

The film part may extend between the bending part of the bus bar frame and the second portion of the bottom part of the frame member.

The film part may further comprise a protrusion film part located between the bending part of the bus bar frame and the first portion of the bottom part of the frame member.

The sum of a thickness of the bending part and a thickness of the first portion may be less than a thickness of the second portion.

The battery cell comprises a protrusion part formed in a width direction, and the protrusion part may be located on the bending part.

The pad part and the film part may be integrally formed.

The film part may be attached to a lower end of the pad part.

The battery module further comprises end plates each coupled to opened sides of the frame member, wherein the opened sides of the frame member may face each other with respect to a longitudinal direction of the battery cell.

The frame member may comprise a module frame that houses the cell block and has an opened upper part, and an upper plate that covers the cell block on the module frame, and the module frame may comprise a bottom part of the frame member and two side surface parts facing each other.

According to another embodiment of the present disclosure, there is provided a battery pack comprising the above-mentioned battery module.

Advantageous Effects

According to embodiments of the present disclosure, by modifying the structure of the existing mono frame, it is possible to reduce the tolerance between the battery cell stack and the frame member and improve the space utilization rate, as compared with a conventional technique.

Further, by utilizing the pad, which is an overflow prevention structure, it is possible to prevent the thermal conductive resin from flowing into an unintended space when the cell block is inserted.

Additionally, by integrally forming the pad and the insulating film, which are the overflow prevention structures, it is possible to reinforce the insulating performance between the battery cell and the module frame while simplifying the assembly.

BRIEF DESCRIPTION OF THE DRAWINGS

FIG. 2 is an exploded perspective view illustrating a battery module according to an embodiment of the present disclosure;

FIG. 3 is a perspective view illustrating a state in which components constituting the battery module of FIG. 2 are combined;

FIG. 4 is a perspective view illustrating one battery cell included in the battery cell stack of FIG. 2;

FIG. 5 is a perspective view illustrating a bus bar frame in the battery module of FIG. 2;

FIG. 6 is a cross-sectional view taken along the xz plane which is the longitudinal direction of the battery cell stack in FIG. 3;

FIG. 7 is a perspective view illustrating a module frame in the battery module of FIG. 2;

FIG. 8 is a perspective view illustrating a state in which a cell block is inserted into the module frame of FIG. 7;

FIG. 9 is a cross-sectional view of a battery module corresponding to the comparative example of FIG. 6;

FIG. 10 is a modified embodiment of FIG. 6, which is a cross-sectional view taken along the xz plane which is the longitudinal direction of the battery cell stack in FIG. 3;

FIG. 11 is a perspective view of a battery module including the film part of FIG. 10; and FIG. 12 is a modified embodiment of FIG. 6, which is a cross-sectional view taken along the xz plane which is the longitudinal direction of the battery cell stack in FIG. 3.

DETAILED DESCRIPTION OF THE EMBODIMENTS

Figure 1:
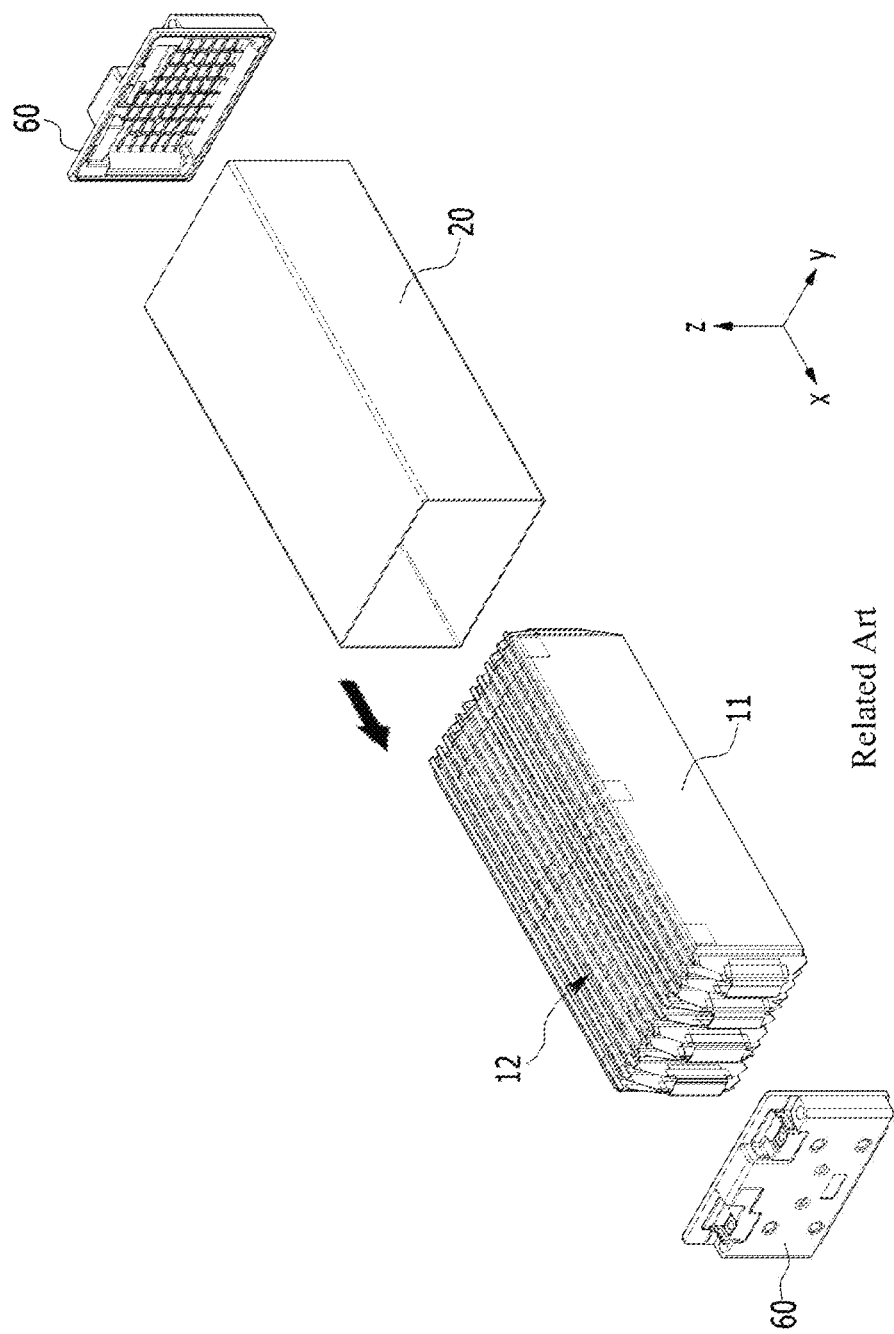
FIG. 1 is an exploded perspective view illustrating a battery module having a mono frame according to the related art.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is an exploded perspective view illustrating a battery module according to an embodiment of the present disclosure. FIG. 3 is a perspective view illustrating a state in which components constituting the battery module of FIG. 2 are combined. FIG. 4 is a perspective view illustrating one battery cell included in the battery cell stack of FIG. 2.

Referring to FIGS. 2 and 3, a battery module 100 according to the present embodiment includes a battery cell stack 120 containing a plurality of battery cells 110, a bus bar frame 130 coupled to each of the front and rear ends of the battery cell stack 120, and a frame member 500 that houses a cell block 140 including the battery cell stack 120 and the bus bar frame 130. The frame member 500 may include a module frame 300 in which the cell block 140 is mounted and the upper part is opened, an upper plate 400 that covers the cell block 140 at the upper part of the module frame 300.

The module frame 300 includes two side surface parts facing each other and a bottom part connecting the two side surface parts. The two side surface parts and the bottom part may be integrally formed. The module frame 300 may be U-shaped.

The frame member 500 may be opened on both sides facing each other with respect to the direction in which the electrode leads of the battery cell stack 120 protrude. The battery module 100 according to the present embodiment may further include an end plate 150 coupled to the cell block on opened both sides of the frame member 500.

The battery module 100 according to the present embodiment includes a thermal conductive resin layer 310 located between the module frame 300 and the battery cell stack 120. The thermal conductive resin layer 310 is a kind of heat dissipation layer, and may be formed by applying a material having a heat dissipation function. The end plate 150 may be formed of a metal material.

When opened both sides of the module frame 300 are referred to as a first side and a second side, respectively, the module frame 300 has a plate-shaped structure that is bent so as to continuously warp the left side, lower and right side surfaces adjacent to each other among the remaining outer surfaces excluding surfaces of the cell block 140 corresponding to the first side and the second side. The upper part corresponding to the bottom part of the module frame 300 is opened.

The upper plate 400 has a single plate-shaped structure that covers the remaining upper part excluding the left side, lower and right side surfaces which are wrapped by the module frame 300. The module frame 300 and the upper plate 400 can be coupled by welding or the like in a state in which the corresponding edge areas are in contact with each other, thereby forming a structure wrapping the cell block 140. That is, the module frame 300 and the upper plate 400 can have a coupling part CP formed at an edge area corresponding to each other by a coupling method such as welding.

The battery cell stack 120 includes a plurality of battery cells 110 stacked in one direction, and the plurality of battery cells 110 may be stacked in the y-axis direction as shown in FIG. 2. In other words, a direction in which the plurality of battery cells 110 are stacked may be the same as a direction in which two side surface parts of the module frame 300 face each other.

The battery cell 110 is preferably a pouch type battery cell. For example, referring to FIG. 4, the battery cell 110 according to the present embodiment may have a structure in which the two electrode leads 111 and 112 protrude from one end part 114a and the other end part 114b of the battery body 113 toward mutually opposite directions, respectively. The battery cell 110 can be manufactured by joining both end parts 114a and 114b of the cell case 114 and both side surfaces 114c connecting them in a state in which an electrode assembly (not shown) is housed in the cell case 114. In other words, the battery cell 110 according to the present embodiment has a total of three sealing parts 114sa, 114sb and 114sc, wherein the sealing parts 114sa, 114sb and 114sc have a structure that is sealed by a method such as heat fusion, and the remaining other side part may be formed of a connection part 115. A space between both end parts 114a and 114b of the battery case 114 is defined as a longitudinal direction of the battery cell 110, and a space between the one side surface 114c and the connection part 115 that connect both end parts 114a and 114b of the battery case 114 is defined as a width direction of the battery cell 110.

The connection part 115 is a region extending long along one edge of the battery cell 110, and a protrusion part 110p of the battery cell 110 may be formed at an end part of the connection part 115. The protrusion part 110p may be formed on at least one of both end parts of the connection part 115 and may protrude in a direction perpendicular to the direction in which the connection part 115 extends. The protrusion part 110p may be located between one of the sealing parts 114sa and 114sb of both end parts 114a and 114b of the battery case 114, and the connection part 115.

The cell case 114 is generally formed of a laminate structure of a resin layer/metallic thin film layer/resin layer. For example, a surface of the battery case formed of an O(oriented)-nylon layer tends to slide easily by an external impact when a plurality of battery cells are stacked in order to form a medium- or large-sized battery module. Therefore, in order to prevent this sliding and maintain a stable stacked structure of the battery cells, an adhesive member, for example, a sticky adhesive such as a double-sided tape or a chemical adhesive coupled by a chemical reaction upon adhesion, can be attached to the surface of the battery case to form the battery cell stack 120. In the present embodiment, the battery cell stack 120 is stacked in a Y-axis direction and housed into the module frame 300 in a Z-axis direction, and then can be cooled by a thermal conductive resin layer described later. As a comparative example thereto, there is a case in which the battery cells are formed as cartridge-shaped components so that fixing between the battery cells is made by assembling the battery module frame. In this comparative example, due to the presence of the cartridge-shaped components, there is almost no cooling action or the cooling may be proceeded in a surface direction of the battery cells, whereby the cooling does not well perform toward a height of the battery module.

Referring to FIGS. 2 and 7, the module frame 300 according to the present embodiment includes a bottom part 300a and two side surface parts 300b facing each other connected by the bottom part 300a. Before the battery cell stack 120 is mounted on the bottom part 300a of the module frame 300, a thermal conductive resin is applied to the bottom part of the module frame 300, and the thermal conductive resin can be cured to form a thermal conductive resin layer 310. The thermal conductive resin layer 310 is located between the bottom part 300a of the module frame 300 and the battery cell stack 120, and can serve to transfer heat generated in the battery cell 110 to the bottom of the battery module 100 and fix the battery cell stack 120.

According to the present embodiment, the thermal conductive resin layer 310 includes a plurality of application lines that extend long in a direction perpendicular to the direction in which the plurality of battery cells 110 are stacked. The plurality of application lines may form two groups, and an insulating film 330 may be formed between the two groups. The insulating film 330 can function to maintain insulating performance between the battery cell 110 and the module frame 300, and at least a part of a thermal conductive resin may be applied onto the insulating film 330.

According to the present embodiment, as shown in FIG. 2, an insulation reinforcing member 345 for reinforcing insulation performance between the battery cell stack 120 and the frame member 500 is formed on the bottom part of the module frame 300. The insulation reinforcing member 345 will be described in detail below.

FIG. 5 is a perspective view illustrating a bus bar frame in the battery module of FIG. 2.

Referring to FIG. 5, the bus bar frame according to the present embodiment comprises a main frame 130a arranged perpendicular to a direction in which the electrode leads 111 and 112 protrude and a bending part 130b extending from a lower part of the main frame 130a. The bus bar frame 130 is connected to the battery cell stack 120 as described with reference to FIGS. 2 and 3. A structure in which the electrode leads pass through slits and are coupled to bus bars may be formed in the main frame 130a. The bending part 130b may be bent by about 90 degrees with respect to the main frame 130a and may be located on the bottom part 300a of FIG. 2. The bending part 130b and peripheral configurations will be additionally described with reference to FIG. 6.

FIG. 6 is a cross-sectional view taken along the xz plane which is the longitudinal direction of the battery cell stack in FIG. 3. FIG. 7 is a perspective view illustrating a module frame in the battery module of FIG. 2. FIG. 8 is a perspective view illustrating a state in which a cell block is inserted into the module frame of FIG. 7.

Referring to FIG. 6, the battery cell 110 according to the present embodiment includes a protrusion part 110p formed in a width direction, and the protrusion part 110p is located on the bending part 130b. Here, the width direction of the battery cell 110 may be the z-axis direction of FIG. 6. The bottom part 300a of the module frame 300 according to the present embodiment includes a first portion 300a1 and a second portion 300a2, wherein the first portion 300a1 is located at an edge based on the longitudinal direction of the battery cells 110, and the second portion 300a2 is located inside the first portion 300a1. At this time, it is preferable that the thickness of the first portion 300a1 is thinner than the thickness of the second portion 300a2. Here, the longitudinal direction of the battery cell 110 may be the x-axis direction of FIG. 6.

Referring to FIGS. 5 and 6, the bending part 130b of the bus bar frame 130 according to the present embodiment is located on the first portion 300a1 of the bottom part 300a of the module frame. At this time, it is preferable that the sum of the thickness of the bending part 130b and the thickness of the first portion 300a1 is thinner than the thickness of the second portion 300a2. This is because the protrusion part 110p of the battery cell 110 is caught by a step between the first portion 300a1 and the second portion 300a2 and thus prevents the battery cell from flowing due to an external impact. In addition, a gap between the battery cell 110 and the frame member may be reduced through the processing of the bottom part 300a of the module frame, and this gap reduction effect may cause synergy with a gap reduction effect that may be obtained through height-direction assembling, thereby maximizing the overall space efficiency. The processing of the bottom part 300a of the module frame may be performed simultaneously while forming the module frame structure. Press forming, NC (numerical control work) processing, or the like may be used in order to form such a step.

The pad part 320 is located between the second portion 300a2 of the bottom part 300a and the battery cell 110, and the thermal conductive resin layer 310 is located inside the pad part 320. That is, the pad part 320 may be located between the thermal conductive resin layer 310 and the first portion 300a1 of the bottom part 300a to define a position where the thermal conductive resin layer 310 is formed. The battery module according to the present embodiment includes a film part 340 connected to the pad part 320 and protruding toward the bus bar frame 130. The pad part 320 may be located on the second portion 300a2, and the film part 340 may be located on the first portion 300a1. At this time, the pad part 320 and the film part 340 may be integrally formed so as to constitute an insulation reinforcing member 345. The film part 340 not only reinforces the insulation between the battery cell 110 or the protrusion part 110p of the battery cell 110 and the module frame 300, but is also integrally formed with the pad part 320, thereby simplifying the assembly with the module frame. In a modified embodiment, the film part 340 may be attached to the lower end of the pad part 320. Both the pad part 320 and the film part 340 are insulating parts, and may be flexible and compressively deformable members. In one example, the pad part 320 may be formed of polyurethane, and the film part 340 may be formed of polyethylene terephthalate (PET). Alternatively, both the pad part 320 and the film part 340 may be formed of polyurethane or polyethylene terephthalate.

Referring to FIGS. 7 and 8, before the cell block 140 is mounted on the module frame 300, an insulation reinforcing member 345 may be formed on the bottom part 300a of the module frame 300.

FIG. 9 is a cross-sectional view of a battery module corresponding to the comparative example of FIG. 6.

Referring to FIG. 9, the insulation reinforcing member according to the comparative example can form the insulating film part 340' in a form separated from the pad part 320. The insulating film part 340' may be formed between the second portion 300a2 of the bottom part 300a of the module frame and the bending part 130b of the bus bar frame. According to the comparative example, alignment is required through an attachment process to form the insulating film part 340', and it is difficult to guarantee the insulation of the exposed portion between the insulating film part 340' and the pad part 320 and/or between the insulating film part 340' and the bending part 130b.

FIG. 10 is a modified embodiment of FIG. 6, which is a cross-sectional view taken along the xz plane which is the longitudinal direction of the battery cell stack in FIG. 3. FIG. 11 is a perspective view of a battery module including the film part of FIG. 10.

Referring to FIGS. 10 and 11, the film part 340 may further include a protruding film part 340p located between the bending part 130b of the bus bar frame and the first portion 300a1 of the bottom part 300a of the frame member. The protruding film part 340p may vertically overlap the bending part 130b of the bus bar frame. Without such an overlapping structure, a gap is created between the film part 340 and the bending part 130b, and the insulation distance and creepage distance between the bottom part 300a of the frame member and the end of the protrusion part 110p of the battery cell 110 may be insufficient. Therefore, according to the present embodiment, the insulation performance can be improved.

FIG. 12 is a modified embodiment of FIG. 6, which is a cross-sectional view taken along the xz plane which is the longitudinal direction of the battery cell stack in FIG. 3.

Referring to FIG. 12, the battery module according to the present embodiment includes a film part 340 that is connected to the pad part 320 and protrudes toward the bus bar frame 130. The pad part 320 may be located on the second portion 300a2, and the film part 340 may be located on the first portion 300a1. At this time, as shown in FIG. 12, the film part 340 may be formed so as to be in close contact with a step connecting the first portion 300a1 and the second portion 300a2 of the bottom part 300a of the module frame. The film unit 340 according to the present embodiment may be integrally formed with the pad part 320 to constitute the insulation reinforcing member 345, or may be attached to the lower end of the pad part 320. Since the film part 340 is formed so as to be in close contact with the step, insulation between the protrusion part 110*p* of the battery cell 110 and the module frame 300 can be further strengthened.

In addition to the differences described above, all the contents described with reference to FIG. 6 can be applied to the present embodiment.

Meanwhile, one or more battery modules according to an exemplary embodiment of the present disclosure may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the invention has been shown and described above with reference to the preferred embodiments, the scope of the present disclosure is not limited thereto, and numerous other modifications and improvements made by those skilled in the art using the basic principles of the invention described in the appended claims will fall within the spirit and scope of the present disclosure.

DESCRIPTION OF REFERENCE NUMERALS

110*p*: protrusion part
140: cell block
320: pad part
340: film part
340*p*: protruding film part
345: insulation reinforcing member

The invention claimed is:

1. A battery module comprising:
a battery cell stack in which a plurality of battery cells are stacked in a first direction,
a bus bar frame coupled to at least one of a front end and a rear end of the battery cell stack, the front end and the rear end of the battery cell stack spaced apart in a second direction,
a frame member that houses a cell block, the cell block including the battery cell stack and the bus bar frame,
a pad part located at one end of a bottom part of the frame member, and
a film part located between the pad part and the bus bar frame in the second direction.

2. The battery module of claim 1, wherein the bottom part of the frame member comprises a first portion and a second portion, the first portion located at an edge with respect to a longitudinal direction of a battery cell of the plurality of battery cells, the second portion located inside the first portion, and
wherein a thickness of the first portion is less than a thickness of the second portion.

3. The battery module of claim 2, further comprising a thermal conductive resin layer located between the second portion and the battery cell stack,
wherein the pad part is located between the thermal conductive resin layer and the first portion.

4. The battery module of claim 3, wherein the pad part is located on the second portion, and the film part is located on the first portion.

5. The battery module of claim 2, wherein the film part is formed so as to be in contact with a step portion connecting the first portion and the second portion of the bottom part of the frame member.

6. The battery module of claim 2, wherein the frame member is opened on both sides facing each other with respect to the longitudinal direction of the battery cell, the bus bar frame is connected to the battery cell stack on the opened sides of the frame member,
wherein the bus bar frame comprises a main frame arranged perpendicular to the longitudinal direction of the battery cell and a bending part extending from a lower part of the main frame, and
wherein the bending part is located on the first portion of the bottom part of the frame member.

7. The battery module of claim 6, wherein the film part extends between the bending part of the bus bar frame and the second portion of the bottom part of the frame member in the second direction.

8. The battery module of claim 7, wherein the film part further comprises a protrusion film part located between the bending part of the bus bar frame and the first portion of the bottom part of the frame member in the second direction.

9. The battery module of claim 6, wherein a sum of a thickness of the bending part and a thickness of the first portion is less than a thickness of the second portion.

10. The battery module of claim 6, each battery cell of the plurality of battery cells comprises a protrusion part formed in a width direction, and the protrusion part is located on the bending part.

11. The battery module of claim 1, wherein the pad part and the film part are formed.

12. The battery module of claim 1, wherein the film part is attached to a lower end of the pad part.

13. The battery module of claim 1, further comprising end plates each respectively coupled to opened sides of the frame member, and
wherein the opened sides of the frame member face each other with respect to a longitudinal direction of a battery cell of the plurality of battery cells.

14. The battery module of claim 1, wherein the frame member comprises a module frame that houses the cell block and has an opened upper part, and an upper plate that covers the cell block on the module frame, and
wherein the module frame comprises a bottom part of the frame member and two side surface parts facing each other.

15. A battery pack comprising the battery module of claim 1.

16. The battery module of claim 1, wherein a thickness of the pad part is greater than a thickness of the film part.

17. The battery module of claim 1, wherein the bus bar frame comprises a bus bar, and
wherein electrode leads extend through slits in the bus bar.

18. The battery module of claim 1, wherein the film part is connected to the pad part.

* * * * *